Patented Jan. 31, 1928.

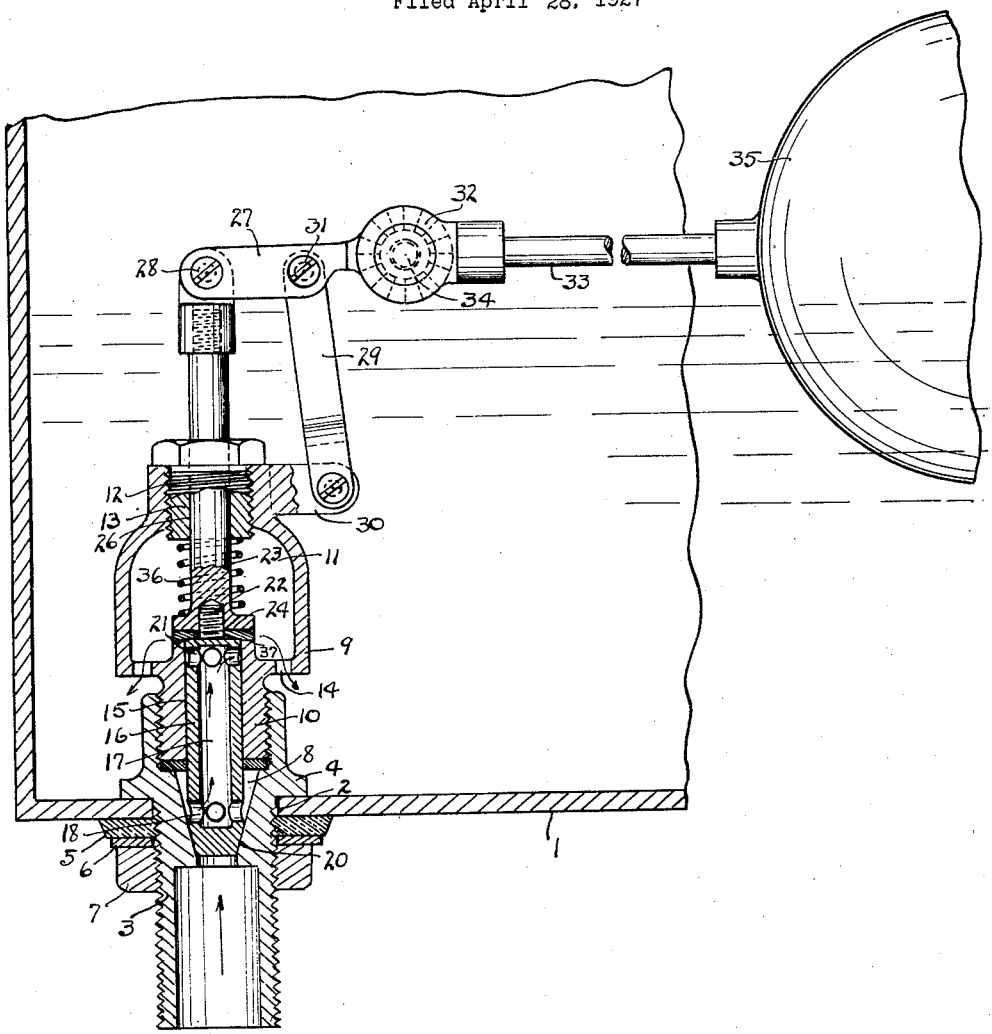

1,657,658

UNITED STATES PATENT OFFICE.

WILLIAM J. BUFORD, OF HOUSTON, TEXAS.

AUTOMATIC VALVE.

Application filed April 28, 1927. Serial No. 187,225.

My invention relates to automatically closing valves such as are employed in controlling the inlet of liquid to tanks and similar containers, and more particularly to toilet flushing tanks.

It is an object of the invention to provide a valve constructed to operate against water under high pressures and to close positively when the water level in the tank attains a predetermined level.

A further object is to provide a valve of this character which is silent in its action and adapted to function quickly, without the usual disagreeable noise and vibration.

It is also desired that the valve be simple and strong in construction and not liable to get out of order in use and also capable of easy removal and renewal if occasion arises.

Referring to the drawing herewith, I have shown a broken section of a flushing tank having my valve installed therein, said valve being in vertical section to illustrate the construction thereof.

The tank 1 may be any usual type of flushing tank having therein an outlet valve, not shown. It has a lower opening 2 therein to receive a valve nipple 3.

Said valve nipple has a radial flange 4 adapted to fit against the inner wall of the tank bottom. The lower end of the nipple extends downwardly through said opening and is threaded to receive packing washers 5 and 6 held tightly clamped about the opening 2 by a nut 7, thereby maintaining a fluid closure about the nipple in the tank bottom.

The body of the nipple has a downwardly tapered seat 8 therein above which the inner wall is threaded to receive the valve housing 9, the lower end 10 of which is of reduced external diameter to fit therein. Above the end 10 the valve housing is enlarged to form a chamber 11. Said valve chamber is formed with an approximately cylindrical body which tapers inwardly at the upper end and is threaded internally at 12 to receive a plug 13, screwed therein. The lower wall of the chamber 11 has a plurality of openings 14 therein to provide for the flow of fluid into the tank.

The member 10 has a central valve passage 15 therein to receive a guide member 16. Said guide member has a central passage 17 therethrough which is closed at its lower end except for a series of radial openings 18 formed in the walls of the passage 17 above the tapered seat 8. Below the openings 18, the guide member is tapered downwardly at 20 to form a loose fit when the valve is in closed position within the tapered seat 8. At the upper end of the passage 17, a plurality of lateral openings 21 allows the flow of liquid into the chamber 11 when the valve is off its seat.

The guide member 16 has a threaded upper shank 22 which is detachably connected with the valve stem 23. The lower end of the valve stem is flared radially into a head 24, the lower face of which has a packing washer 25 thereon normally held in position by the guide member 16 screwed therein. The valve stem 23 extends upwardly through a passage 26 in the plug 13 and is connected at its upper end to a lever arm 27 through the pivot pin 28.

The lever arm 27 has a fulcrum formed on a link 29 pivoted at its lower end upon an arm 30 formed upon the upper end of the valve chamber 9. Its upper end has a pivotal connection at 31 with said lever 27. The lever arm 27 has a jointed connection 32 with the float arm 33. This jointed connection is an adjustable one, there being a central pivot 34 connecting the lever arm with the float arm and interengaging teeth on the adjacent arms which may be secured in any adjusted position to regulate the angle of the float arm 33 relative to the lever arm. The float arm has thereon the usual float 35 which is preferably of hollow sheet metal construction.

The valve disclosed is intended particularly for heavy use when connected with water mains carrying heavy pressures. In such constructions it is ordinarily necessary to have a very large float 35 with a particularly long lever arm thereon to close the valve against the excessive pressures of the liquid in the pipes. To overcome these pressures, I have employed a spring 36, surrounding the valve stem 23 and bearing at its lower end upon the head 24 of the valve and at its upper end upon the lower face of the plug 13. This spring is so calibrated as to exert a downward pressure upon the valve, tending to hold the valve on the seat 37 formed on the lower wall of the chamber 11 with a pressure somewhat less than the pressures of the water in the pipes leading to the valve. This spring will thus tend to hold the valve closed and the pressure to be exerted upon the valve through the float 35 need be only sufficient to exert a balance of pressure so that the combined force of the float and the spring will overcome the high pressure in the pipe and close the valve, as in the case of valves employed with low pressures.

When the valve is open to admit liquid to the tank 1, the water will enter through the nipple 3 and through the openings 18 leading to the passage 17 and will pass outwardly to the valve chamber 11 through the openings 21. It may then find an exit into the tank through the openings 14 in the chamber. It will be seen that the water will be admitted into the chamber within the walls 8 in the upper end of the nipple and from there through the small openings at both ends of the passage 17 and will then be forced laterally against the walls of the chamber 11 and will pass downwardly from said chamber. This passage of the water through the course thus provided will break the force of the water under the pressure exerted thereon and will prevent the usual noise and vibration due to the entrance of the water under pressure. Very little vibration and noise will be experienced.

When the tank is gradually filled with water entering past the valve, the float will rise under the pressure of the water entering the tank and will finally force the valve head 24 against its seat. It will be assisted in this closing of the valve by the spring 36, as previously described. It will be seen that the spring 36 exerting a powerful pressure upon the head 24 will hold the float 25 in a position approximately horizontal and but little upward motion of the float will be necessary to close the valve and its closing will hence be somewhat abrupt, thus further preventing objectionable noises which might result from the gradual closing of the valve in the usual manner.

The advantages of the construction lie in its noiseless action and its capacity for operating effectively under high pressure. It will be noted also that the tension on the spring 36 may be greatly decreased by adjustment through the threaded plug 13, and thus the valve may be regulated for different pressures encountered in the mains in different parts of the city, or in different cities. The spring may even be removed where it is not necessary, and when removed, the float 35 will operate the valve in the usual manner.

It is to be noted that the valve and its parts may be easily removed by disconnecting the valve stem from the lever arm 27 and unscrewing the plug 13 from the chamber.

Having thus described my invention, what I claim as new and desire to protect by Letters Patent is:

1. A float-controlled valve for tanks comprising a valve housing having a cylindrical passage leading thereto, a guide tube in said passage, said tube having lateral openings at each end, a valve head above said tube, a valve stem thereon, a seat at the upper end of said passage for said head, and a float controlled arm on said valve stem.

2. A float-controlled valve for tanks comprising a valve housing having a cylindrical passage leading thereto, a guide tube in said passage, said tube having lateral openings at each end, a tapered lower end on said guide tube, a tapered chamber into which said end fits loosely, a valve head above said tube, a valve stem thereon, a seat at the upper end of said passage for said head, and a float controlled arm on said valve stem.

3. A float-controlled valve for tanks comprising a valve housing having a cylindrical passage leading thereto, a guide tube in said passage, said tube having lateral openings at each end, a valve head above said tube, a valve stem thereon, a seat at the upper end of said passage for said head, a float controlled arm on said valve stem, and means in said housing acting to hold said valve head on its seat with a predetermined pressure.

4. A float-controlled valve for tanks comprising a valve housing having a cylindrical passage leading thereto, a guide tube in said passage, said tube having lateral openings at each end, a valve head above said tube, a valve stem thereon, a seat at the upper end of said passage for said head, a float controlled arm on said valve stem, and a spring on said stem acting to hold said valve head on its seat, the tension on said spring being adjustable.

5. In a float controlled valve for tanks, a valve housing comprising a chamber having an inlet passage leading thereto, a valve seat surrounding said passage, the walls of said chamber being spaced from said seat, said walls having lower outlet openings therein, a valve head adapted to fit said seat, a guide tube carried by said head and slidable in said inlet passage, said tube being constructed to impede the flow of liquid therethrough and direct it laterally against the walls of said chamber when said valve is open.

6. In a float controlled valve for tanks, a valve housing comprising a chamber having an inlet passage leading thereto, a valve seat surrounding said passage, the walls of said chamber being spaced from said seat, said walls having lower outlet openings therein, a valve head adapted to fit said seat, a guide tube carried by said head and slidable in said inlet passage, said tube being constructed to impede the flow of liquid therethrough and direct it laterally against the walls of said chamber when said valve is open, a stem on said valve, a float-controlled arm connected with said stem and additional means assisting the closing of said valve.

7. A float-controlled valve for tanks including a valve housing, a valve chamber therein having openings therein, a valve seat surrounding one of said openings, a valve in the chamber, a valve stem on said valve, a lever arm connected with said stem, a float arm on said lever arm and adjustable vertically relative thereto, a float on said arm tending to close said valve when said tank is filled, and resilient means bearing on said valve to assist said float in closing said valve.

8. In a float-controlled valve for tanks, a valve housing, having a passage through its wall and having a valve seat at the upper end of the passage, a valve for cooperating with said seat, lateral walls in said housing spaced from said valve, a valve stem on said valve, a float connected therewith, and means to impede the flow of liquid to said valve and to direct it laterally against the walls of said housing when said valve is open.

In testimony whereof I hereunto affix my signature this 23rd day of April A. D. 1927.

WILLIAM J. BUFORD.